United States Patent [19]

Leibowitz et al.

[11] 4,214,820

[45] Jul. 29, 1980

[54] ELECTROCHROMIC DISPLAY HAVING ENHANCED NIGHT VIEWABILITY

[75] Inventors: Marshall Leibowitz, Ridgefield; Alan Willis, Stamford; Douglas George, Waterbury, all of Conn.

[73] Assignee: Timex Corporation, Waterbury, Conn.

[21] Appl. No.: 942,725

[22] Filed: Sep. 15, 1978

[51] Int. Cl.² .............................................. G02F 1/17
[52] U.S. Cl. ................................................... 350/357
[58] Field of Search ............... 350/357, 345, 353, 363; 340/763, 785; 250/462, 463

[56] References Cited

U.S. PATENT DOCUMENTS

| | | | |
|---|---|---|---|
| 3,147,225 | 9/1964 | Ryan | 65/30 E X |
| 3,409,770 | 11/1968 | Clapham, Jr. | 250/462 |
| 3,944,333 | 3/1976 | Leibowitz | 350/357 |
| 3,998,525 | 12/1976 | Giglia | 350/357 |
| 4,116,546 | 9/1978 | Leibowitz | 350/357 |
| 4,126,384 | 11/1978 | Goodman et al. | 350/345 |

OTHER PUBLICATIONS

J. H. Zechman, "Alphanumeric Electrochemical Display", *IBM Technical Disclosure Bulletin*, vol. 14, No. 1, Jun., 1971, pp. 201-202.

*Primary Examiner*—James W. Davie
*Attorney, Agent, or Firm*—Edward J. Timmer

[57] ABSTRACT

A plurality of self-luminous light sources, each preferably comprising a transparent shell, a radioactive material encapsulated in the shell, and a radioluminescent material coated on the shell, are incorporated in the ion-conducting layer of an electrochromic display at selected locations behind the image-forming electrochromic segments to provide sufficient back lighting for enhanced night viewability of the display elements.

10 Claims, 3 Drawing Figures

ELECTROCHROMIC DISPLAY HAVING ENHANCED NIGHT VIEWABILITY

BACKGROUND OF THE INVENTION

1. Field of the Invention:

This invention relates generally to electrooptical displays of the electrochromic type and, more particularly, to electrochromic display constructions having improved night visibility.

2. Description of the Prior Art:

It is generally known that electrooptical displays of the electrochromic type possess several advantages over the more widely used liquid crystal displays. For example, the electrochromic display generally exhibits much better legibility than a liquid crystal display, chiefly as a result of the former's higher contrast. Also, polarizers are not required in conjunction with electrochromic displays whereas they are with displays of the liquid crystal type. A problem common to both types of displays is to provide sufficient night viewability to the observer. In the area of liquid crystal displays, this problem has been solved by placing a conventional light source, such as an incandescent bulb, beta ray phosphor lamp, and the like behind the display for back lighting. Back lighting has proved effective since the components of the liquid crystal display can be made of materials transparent to the back light. However, at least with respect to some electrochromic display constructions, conventional back lighting by placing a light source behind the display is difficult or impossible to achieve because certain components of the display are opaque or nearly so to the back light. For example, the electrolytes used in electrochromic displays may be liquids, gels, pastes, or solids, many of which are not transparent. In addition, most electrochromic displays utilize a pigment material in the electrolyte gap to provide enhanced contrast to the upper electrochromic layers on the image-forming electrodes and to hide the lower electrochromic layer on the counter-electrode. For example, in an embodiment of the Leibowitz patent U.S. Pat. No. 3,944,333, a pigment layer is provided between a porous membrane containing a liquid electrolyte and the counter electrode. The counter electrode itself may be formed by metallizing a ceramic plate. Of course, the presence of either the pigment layer or metallized ceramic plate or both in the display prevents utilization of conventional back lighting to enhance night viewability.

As represented by U.S. Pat. No. 3,998,525, some prior art workers have attempted to improve night viewability of electrochromic displays by side or edge illumination of the display sandwich.

The use of radioactive light emitters to illuminate the periphery of a transparent watch dial is shown in U.S. Pat. No. 3,701,900. Radioactive microspheres in intimate contact with a phosphor are disclosed in U.S. Pat. No. 3,147,225. Discrete encapsulated electroluminescent materials are shown in the following patents: U.S. Pat. Nos. 2,881,344; 2,944,177; 2,976,446; 3,475,640; and 4,020,389. However, the phosphor materials are activated by electric fields rather than by radioactive decay particles.

SUMMARY OF THE INVENTION

The present invention has as a primary object the improvement in night viewability of electrooptical displays of the electrochromic type, expecially those electrochromic displays which are not amenable to conventional back lighting.

This object as well as others are achieved in the present invention by providing a first substrate with transparent electrodes and image-forming electrochromic layers thereon, a second spaced substrate with a counter electrode and an ion-conducting layer between the substrates, wherein the improvement comprises positioning self-luminous light means within the ion-conducting layer at such locations or levels behind the image-forming electrochromic layers that sufficient back lighting of the layers is achieved to impart night viewability to the display, the self-luminous light means including radioactive emitter means and radioluminescing means in cooperative relationship within the ion-conductive layer.

In a particular preferred embodiment, the self-luminous light means includes a plurality of individual light sources each comprising a radioactive emitter in the form of a transparent shell and radioactive material encapsulated in the shell and radioluminescing means in the form of a radioluminescent material coated on the shell. Typically, the radioactive material is tritium gas and the radioluminescent material is a phosphor.

BRIEF DESCRIPTION OF THE DRAWINGS

Further objects and advantages of the present invention will be more fully understood by reference to the following description taken in connection with the accompanying drawings, in which.

DETAILED DESCRIPTION OF THE INVENTION

Figure 1:
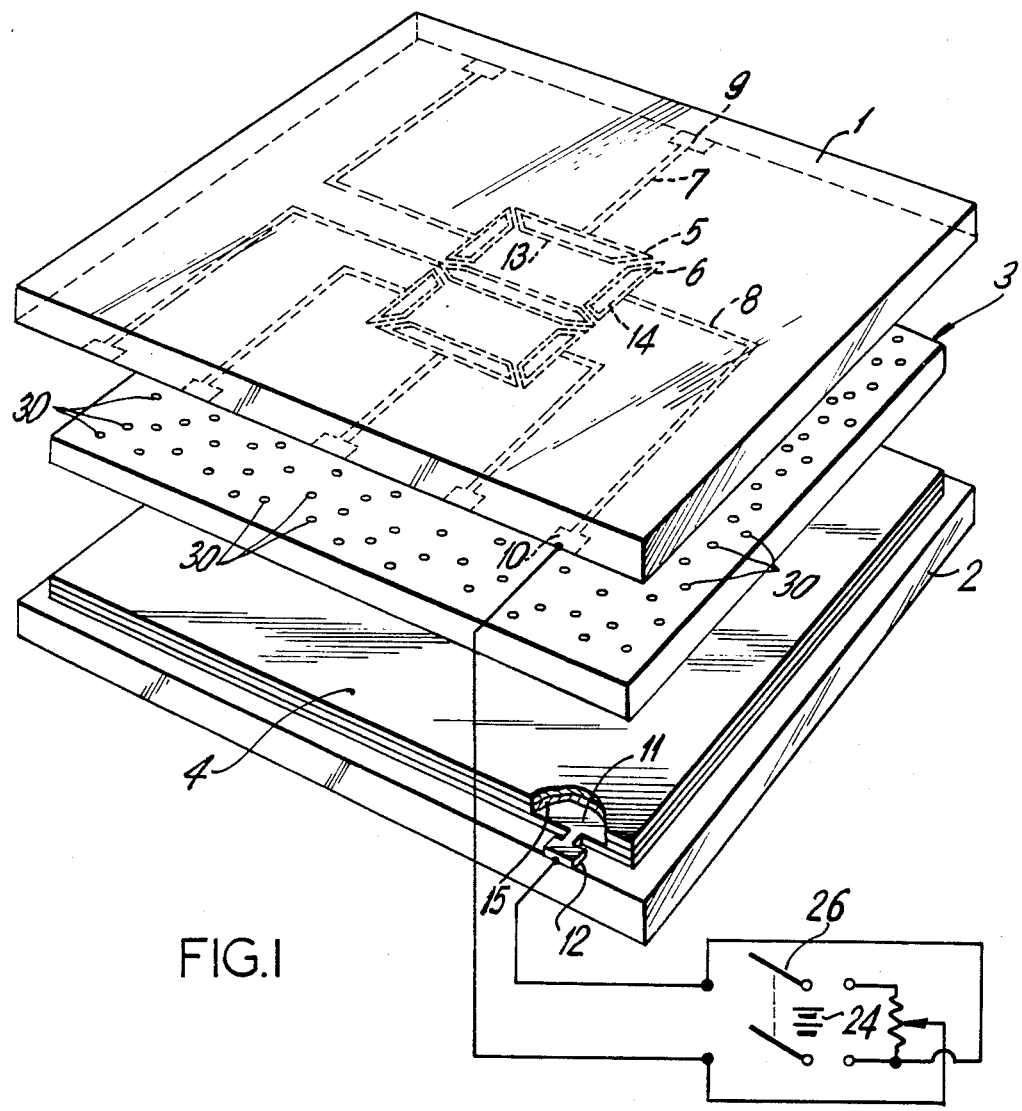
FIG. 1 is an exploded perspective view of a typical electrochromic display incorporating the present invention.

Referring now to FIG. 1 of the drawings, the electrochromic display is a sandwich construction of a first transparent substrate 1, a second spaced substrate 2, which need not be transparent, an ion conducting layer 2, such as electrolyte, and a pigment layer 4 between the ion-conducting layer and substrate 2. Substrate 1 has a conductive pattern of transparent electrodes on the underside thereof, such as electrode segments 5,6 which can be selectively actuated via conductive leads 7,8 leading to terminals 9,10 to form digits or other optical patterns. Substrate 1 may be of transparent glass or plastic with a selected pattern of transparent electrodes 5,6 thereon of a material such as tin oxide. The pattern may be etched on the substrate by using a commercially available material known as NESA glass and removing the conducting coating except for electrode segments 5,6.

The second substrate 2 has a conductive back electrode 11 thereon. Substrate 2 may be made of glass, ceramic or plastic, coated with a suitable conductive layer to form back electrode 11 connected to terminal 12.

Coated on the transparent electrode segments 5,6 and also on the back electrode 11 are layers of electrochromic material indicated as 13, 14 15. The electrochromic layers 13 and 14 on segments 5, 6 respectively are applied by suitable masking techniques to cover a smaller area than the electrodes so as to give good edge definition. Many electrochromic materials exist which change color according to oxidation state. Some of these are described in U.S. Pat. Nos. 2,319,765 and 3,521,941 as well as others. The preferred electrochromic material for use in the present invention is an oxide of tungsten, such as tungsten trioxide. The tungsten oxide is deposited by vacuum evaporation or other suitable processes on electrode segments 5,6 and counter electrode 11. However, similar techniques can be applied to other electrochromic systems, for example, viologen.

Ion-conducting layer 3 may take various forms including, but not limited to, liquid electrolytes, gelled electrolytes, paste electrolytes, ion-conducting solids or ion-exchange resins. These types of ion-conducting layers are well known in the art; for example, see U.S. Pat. Nos. 3,453,038, 3,521,941, 3,827,784, 3,840,287, 3,971,624, 3,995,943, 4,009,936, and 4,012,831. In addition, in certain situations, a porous separator sheet (not shown) may be utilized as a carrier for the electrolyte, for example, as shown in U.S. Pat. No. 3,944,333. In the present invention, the preferred ion-conducting layer 3 comprises polystyrene sulfonic acid as described more fully in copending Leibowitz application entitled "Electrochromic Device with Cationic Ion Exchange Resin Separator" U.S.S.N. 791,536 filed Apr. 27, 1977 U.S. Pat. No. 4,116,546. Usually, this ion-conducting layer would be on the order of 3 MIL to 25 MIL in thickness and can be incorporated into the display by vacuum filling, spraying, knife blading and then wetting.

Optionally, as disclosed for example in the Leibowitz, U.S. Pat. 3,944,333, pigment layer 4 may be disposed between ion-conducting layer 3 and counter-electrode 11 to enhance the contrast of the display. The pigment material is selected to provide the best contrast for electrochromic layers 13, 14 and for hiding layer 15. One suitable pigment is titanium dioxide which is white in color, provides good contrast with upper layers 13, 14 of tungsten oxide electrochromic material and also hides counter-electrode 11. The pigment layer typically is from 2.5 to 5 MILS in thickness. Other suitable pigment materials will be apparent to those skilled in the art.

In addition to pigment layer 4, it is preferred in the present invention to incorporate a small amount of contrast-enhancing pigment, such as titanium dioxide, in the ion-conducting layer 3 for light diffusing purposes.

Figure 2:
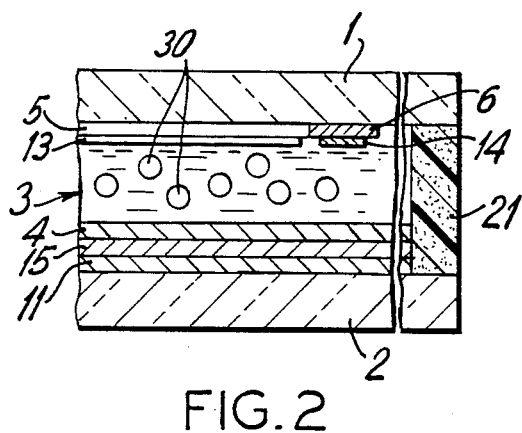
FIG. 2 is an enlarged cross-sectional view taken through an assembled display of the kind shown in FIG. 1 wherein the self-luminous light sources are positioned randomly in the ion-conducting membrane.
Figure 3:
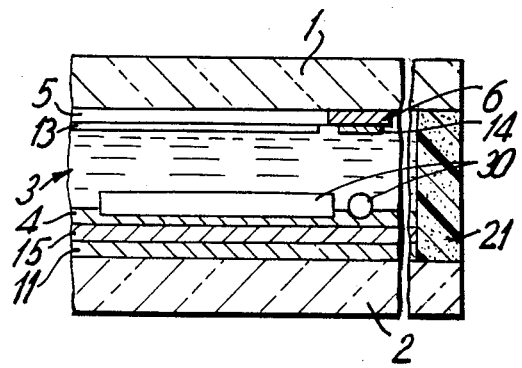
FIG. 3 is similar to FIG. 2 except that the light sources are positioned partially in the lower part of the ion-conducting membrane and are aligned vertically beneath the imaging-forming electrodes.

Reference to FIGS. 2 and 3 of the drawing shows assembled displays of the invention in cross-section. Substrates 1, 2 are attached together by adhesive 21, such as epoxy, which serves to hold the assembly as a unit and to seal the inner layers around the periphery of the sandwich structure.

Illustrated in the drawing are conventional circuit elements for actuating the display such as by applying an electric field from battery 24 to a selected segment 6 via terminal 10 and the counter-electrode 11 via terminal 12. By actuation of the two-pole double-throw switch 26, the polarity of the applied voltage may be reversed to erase the image.

In accordance with the preferred embodiment of the invention, the self-luminous light means disposed in ion-conducting layer 3 includes one or more self luminous light sources 30 positioned in the layer 3 at such locations behind electrochromic layers 13, 14 that sufficient back lighting of layers 13, 14 is achieved for enhanced night viewability of the display. In FIG. 2, a plurality of light sources 30 are more or less randomly mixed or suspended throughout the ion-conducting layer whereas in FIG. 3, the light sources are arranged beneath and in vertical alignment with electrode segments 5,6 a portion of each light source being embedded in layer 3 and a portion in pigment layer 4 as shown. Of course, the location or level at which the light sources are positioned in the ion-conducting layer to achieve sufficient back lighting will depend upon the type of ion-conducting material utilized and its thickness as well as upon the presence of diffusing pigment in the layer.

A preferred self-luminous light source useful in the invention comprises a radioactive emitter means in the form of a glass, plastic, or other transparent shell and a radioactive beta-ray emitting material sealed in the shell and radioluminescing means in the form of a radio luminescent material, preferably a phosphor, coated or otherwise applied to the shell preferably on the interior thereof. If the phosphor is applied on the shell exterior, an additional encapsulating layer of glass, plastic or other transparent material may be applied thereover to prevent harmful interaction of the phosphor with the ion-conducting layer, depending upon the type of ion-conductive medium employed. Various beta-ray emitting materials and radioluminescent phosphors are useful in the present invention. Exemplary materials are described in the Clapham U.S. Pat. No. 3,409,770. However, a preferred beta-ray emitter for use in the invention is tritium gas sealed in a glass shell and a preferred phosphor is a green beta-ray activated phosphor inside the tube. Tubular shaped tritium light sources are available commercially from Self Powered Lighting Corporation or American Atomics Corporation. Another preferred beta-ray emitter is promethium 147 sealed in glass microspheres together with a phosphor. Light sources of this type are available from the 3M Company and are described in more detail in U.S. Pat. No. 3,147,225. With respect to the drawing, light sources of the microsphere shape are preferred for the embodiment shown in FIG. 2 whereas tubular light sources are preferred for that shown in FIG. 3 wherein the longitudinal axes of the tubes and electrode segments 5 and 6 lie in a common vertical plane through the display. Of course, other physical arrangements of the light sources in the ion-conducting layer are possible. In addition, the shape and number of light sources can be varied as desired to achieve the particular back lighting effect needed for a specific service application. It is considered within the scope of the invention to use only one self-luminous light source suitably configured and positioned to provide the back lighting desired.

Of course, the size of the self-luminous light sources must be such that they can be placed in the display without interfering with its functioning or without inordinately increasing its size. The commercially available sources identified above can be readily incorporated into current electrochromic displays with only minor modification. For example, the tubular light sources are available in a standard minimum thickness of 0.030 inch while current electrochromic displays are 0.025 inch in thickness between front and rear substrates. The display separation can be increased to accomodate the sources without significant problems. The microspherical light sources are available in a standard minimum diameter of several microns and thus can be incorporated into existing displays with little modification.

Also included within the scope of the invention and within the meaning of "self-luminous light means" is the combination of one or more discrete radioactive emitters, such as for example individual glass shells containing tritium gas or other radioactive material, and discrete radioluminescent material in the form of particulate, layers and the like interspersed or otherwise cooperatively positioned within the ion-conducting layer 3 to provide the desired back lighting of image-forming electrochromic segments 13, 14.

In addition to providing an electrochromic display having improved night viewability, the present invention is advantageous in that safety of the device is assured by double encapsulation, that is, the radioactive material is encapsulated in the transparent shell and also by the components of display. Also the transparent glass or plastic shell substantially prevents deleterious interactions between the display components and shell contents.

While there has been described what is considered to be preferred embodiments of the invention, other modifications will occur to those skilled in the art and it is desired to cover in the appended claim all such modifications as fall within the spirit and scope of the invention.

I claim:

1. In an electrochromic display comprising a first substrate with selectively actuable transparent electrodes and image-forming electrochromic layers thereon, a second spaced substrate with a counter-electrode and an ion-conducting layer therebetween, the improvement which comprises:
   self luminous light means disposed within the ion-conducting layer at such locations behind the image-forming electrochromic layers that sufficient back lighting of said layers for enhanced night viewability is achieved, said light means including radioactive emitter means and radioluminescing means in cooperative relationship within said ion-conducting layer.

2. The improved display of claim 1 wherein the self-luminous light means comprises a plurality of individual light sources, each source including a radioactive emitter in the form of a transparent shell and radioactive material encapsulated in the shell and radioluminescing means in the form of radioluminescent material coated on the shell.

3. The improved display of claim 2 wherein the radioactive material is tritium gas and the radioluminescent material is a phosphor.

4. In an electrochromic display comprising a first substrate with selectively actuable transparent electrodes and image-forming electrochromic layers thereon, a second substrate with a counter-electrode and an ion-conductive layer there-between, the improvement which comprises:
   a plurality of self-luminous light sources disposed within the ion-conducting layer at such locations behind the image-forming electrochromic layers that sufficient back lighting of said layers for enhanced night viewability is achieved, said light sources each comprising a transparent shell, a radioactive material encapsulated in the shell and a radio-luminescent material coated on the shell.

5. The improved display of claim 4 wherein the light sources are disposed in random fashion throughout the ion-conducting layer.

6. The improved display of claim 5 wherein each light source is in the shape of a microsphere.

7. The improved display of claim 4 wherein the light sources are disposed in the ion-conducting layer at a selected level beneath and in vertical alignment with the image forming electrochromic layers.

8. The improved display of claim 7 wherein each light source is in the shape of a tube and each tube is aligned beneath one of the image-forming electrochromic layers such that the longitudinal axes of the tube and electrochromic layer lie in the same vertical plane through the display.

9. The improved display of claim 4 wherein each light source includes a glass shell, beta-ray emitting tritium gas sealed within the shell and a radioluminescent phosphor coated on the shell.

10. The improved display of claim 4 wherein a pigment layer is disposed between the ion-conducting layer and the counter-electrode to provide contrast with the image-forming electrochromic layers and to hide the counter-electrode.

* * * * *